Patented Dec. 7, 1937

2,101,333

UNITED STATES PATENT OFFICE

2,101,333

PROCESS OF PRODUCING SYNTHETIC RESINS

Walter Frankenburger, Herbert Hammerschmid, and Georg Roessler, Ludwigshafen-on-the-Rhine, Germany, assignors to I. G. Farbenindustrie Aktiengesellschaft, Frankfort-on-the-Main, Germany No Drawing. Application January 30, 1937, Serial No. 123,292. In Germany February 5, 1936

6 Claims. (Cl. 260—130)

The present invention relates to a process of producing synthetic resins.

It has already been proposed to condense aliphatic aldehydes, as for example acetaldehyde, crotonaldehyde and the like, in the presence of primary or secondary amines to form a mixture of oils and resins. The resins thus obtained have, however, disadvantages, as for example sticking when polished, dark color, disappearance of the lustre and comparatively slight resistance to water, which impair their use in practice.

We have now found that valuable synthetic resins are obtained by condensing aliphatic aldehydes containing from 2 to 4 carbon atoms with primary or secondary alkylamines or aralkylamines or secondary heterocyclic bases or their salts with weak acids, the resulting resinous products being treated with inorganic condensing halides after the distilling off of the readily volatile oils simultaneously formed. The resins thus obtained have considerable advantages over those already known. They are paler, more readily capable of being polished, more waterproof and more readily soluble in organic solvents. Primary or secondary alkylamines, aralkylamines or secondary heterocyclic bases or their salts with weak acids suitable for the present process are for example methylamine, ethylamine, butylamine, benzylamine and the corresponding diamines or piperidine as well as their salts with acetic acid, propionic acid, butyric acid, glycolic acid and lactic acid. If desired polyvalent alcohols, such as glycerine or glycol or also resin acids, such as colophony or the various abietic acids, contained therein, may be present in the reaction mixture.

The treatment of the resins formed with the condensing halides, such as aluminium chloride, boron fluoride, the addition products of boron fluoride with ethers, alcohols and acids, antimony chloride or phosphorus chloride, may be carried out in the fused or dissolved state at temperatures of from 80 to 250° C. In this way in particular the capability of polishing the resins, their softening point and also the hardness, waterproof properties and lustre of the polishes prepared therefrom are improved. If desired, the crude reaction mixture formed in the first stage of the process may be treated at elevated temperatures especially while boiling, with formic acid and after distilling off the readily volatile oils, the mixture may be treated with the condensing halides. Thus resins of a still more paler color are obtained.

The resins thus obtained, in addition to their use as polishes, may also be used for resin lacquers, for impregnations, for electrical purposes, for sound records and quite generally in all cases where otherwise valuable natural resins, such as shellac, are used.

The following examples will further illustrate how the present invention may be carried out in practice but the invention is not restricted to these examples. The parts are by weight.

Example 1

20 parts of dimethylamine are allowed to drop slowly into a mixture of 520 parts of crotonaldehyde and 50 parts of butylene glycol, the whole being boiled under reflux for six hours. After separating the water formed, distillation is carried out at atmospheric or reduced pressure until distillate no longer passes over. 230 parts of crude resin are thus obtained. This is dissolved in an equal amount of benzene and treated while boiling with 5 parts of antimony trichloride. After filtering and distilling off the benzene, 190 parts of resin having a softening point of 83° C. are obtained.

Example 2

75 parts of diethylamine lactate are added to a mixture of 1400 parts of acetaldehyde and 150 parts of glycerine, and the mixture is boiled for six hours under reflux. After separating the water formed, 90 parts of formic acid are added and the whole is boiled for another hour. After distillation, there are obtained as a residue 800 parts of a resin having a softening point of 87° C. This resin is treated with antimony trichloride as described in Example 1 a pale product being obtained.

Example 3

20 parts of piperidine are allowed to flow slowly into 520 parts of crotonaldehyde and 60 parts of ethylene glycol, the whole then being boiled under reflux for several hours. In the subsequent distillation in vacuo, 92 parts of water and 175 parts of oil are obtained. The viscous residue is then boiled with 60 parts of formic acid for several hours, and the product again subjected to distillation. The 270 parts of resin thus remaining are dissolved in an equal amount of benzene and treated while boiling for half an hour with 12 parts of boron fluoride. After filtering and distilling off the benzene, 200 parts of resin having a softening point of 80° C. are obtained.

Example 4

30 parts of diethylamine are allowed to flow slowly into a mixture of 470 parts of acetaldehyde and 60 parts of glycerine. By reason of the heat of reaction, the temperature of the mixture rises to about 100° C. during the course of two hours. The whole is then boiled for four hours under reflux, the water formed is separated, 17 parts of formic acid are added and the whole again boiled for a short time. After distilling off the readily volatile constituents, 350 parts of crude resin are obtained. This is dissolved in an equal amount of benzene and 12 parts of aluminium chloride are added. After boiling the mixture for one hour filtering and distilling off the benzene, 300 parts of resin are obtained.

Example 5

150 parts of anhydrous formic acid are added to 3000 parts of a condensation product derived from acetaldehyde and diethylamine in the proportions 15:1 and the whole is boiled for half an hour. After distilling off 600 parts of oil and water, there remain 2500 parts of resin having a saftening point of 60° C. This is dissolved in 2500 parts of benzene and 50 parts of anhydrous aluminium chloride are added. After boiling for 1 hour, the whole is filtered and the solvent distilled off. 2300 parts of resin having a softening point of 75° C. are obtained.

Example 6

130 parts of anhydrous formic acid are added to 1300 parts of a condensation product derived from acetaldehyde and diethylamine in the proportions 15:1 and the whole boiled for half an hour. After distilling off 250 parts of oil and water, 10 parts of gaseous boron fluoride are led into the liquid product during the course of an hour at 230° C. 1200 parts of resin having a softening point of 64° C. are thus obtained.

Example 7

200 parts of a colophony as free as possible from hydroxy-acid (for example WW brand) are dissolved in a mixture of 2400 parts of water and 225 parts of diethylamine. 2760 parts of acetaldehyde are allowed to flow in during the course of about an hour while cooling with water. The whole is then heated to boiling for two hours. After cooling, the water (about 3500 parts) is separated and the resulting resin boiled for half an hour with about 200 parts of formic acid. The volatile constituents are separated by distillation. During the course of an hour at 200° C., about 30 parts of the addition compound boron fluoride-diethyl ether are blown in in a current of nitrogen. After the completion of the leading in, the unconverted boron fluoride and the volatile products are removed in a current of nitrogen while keeping the whole at the same temperature for about one quarter of an hour. After cooling, about 2500 parts of a pale resin having a softening point of about 80° C. are obtained which may readily be worked up, especially in combination with nitrocellulose, into polishes having high lustre.

What we claim is:—

1. A process of producing synthetic resins which comprises condensing aliphatic aldehydes containing from 2 to 4 carbon atoms by means of a substance of the group of primary and secondary alkyl- and aralkylamines, secondary heterocyclic bases and their salts with weak acids, distilling off the readily volatile oils formed and treating the resulting resinous products with inorganic condensing halides at temperatures of between 80° and 250° C.

2. Modification of the process as claimed in claim 1, which comprises treating the crude reaction mixture formed in the first stage of the process with formic acid at elevated temperatures and, after distilling off the readily volatile oils with an inorganic condensing halide.

3. A process of producing synthetic resins which comprises condensing aliphatic aldehydes containing from 2 to 4 carbon atoms in admixture with a polyvalent alcohol by means of a substance of the group of primary and secondary alkyl- and aralkylamines, secondary heterocyclic bases and their salts with weak acids, distilling off the readily volatile oils formed and treating the resulting resinous products with inorganic condensing halides at temperatures of between 30° and 250° C.

4. A process of producing synthetic resins which comprises condensing aliphatic aldehydes containing from 2 to 4 carbon atoms in admixture with a resin acid by means of a substance of the group of primary and secondary alkyl- and aralkylamines, secondary heterocyclic bases and their salts with weak acids, distilling off the readily volatile oils formed and treating the resulting resinous products with inorganic condensing halides at temperatures of between 80° and 250° C.

5. A process of producing synthetic resins which comprises condensing aliphatic aldehydes containing from 2 to 4 carbon atoms by means of a substance of the group of primary and secondary alkyl- and aralkylamines, secondary heterocyclic bases and their salts with weak acids, distilling off the readily volatile oils formed and treating the resulting resinous products with boron fluoride at temperatures of between 80° and 250° C.

6. A process of producing synthetic resins which comprises condensing aliphatic aldehydes containing from 2 to 4 carbon atoms by means of diethylamine, distilling off the readily volatile oils formed and treating the resulting resinous products with inorganic condensing halides at temperatures of between 80° and 250° C.

WALTER FRANKENBURGER.
HERBERT HAMMERSCHMID.
GEORG ROESSLER.